United States Patent
Öhman et al.

(10) Patent No.: US 8,126,137 B2
(45) Date of Patent: Feb. 28, 2012

(54) VECTORED DIGITAL SUBSCRIBER LINE SYSTEM HAVING MODULAR VECTORING ARRANGEMENTS

(75) Inventors: Hans Öhman, Luleå (SE); Frank Sjöberg, Luleå (SE)

(73) Assignee: Ericsson AB, Stockholm (SE)

( * ) Notice: Subject to any disclaimer, the term of this patent is extended or adjusted under 35 U.S.C. 154(b) by 492 days.

(21) Appl. No.: 12/445,853

(22) PCT Filed: Sep. 21, 2007

(86) PCT No.: PCT/EP2007/060015
§ 371 (c)(1), (2), (4) Date: Apr. 16, 2009

(87) PCT Pub. No.: WO2008/046714
PCT Pub. Date: Apr. 24, 2008

(65) Prior Publication Data
US 2010/0034374 A1  Feb. 11, 2010

Related U.S. Application Data

(60) Provisional application No. 60/852,997, filed on Oct. 20, 2006.

(30) Foreign Application Priority Data

Oct. 20, 2006  (EP) .................................... 06122656

(51) Int. Cl.
*H04M 1/76* (2006.01)
(52) U.S. Cl. .......................... 379/417; 379/416; 375/222
(58) Field of Classification Search ............. 379/406.06, 379/416, 417; 375/222
See application file for complete search history.

(56) References Cited

U.S. PATENT DOCUMENTS

| | | | |
|---|---|---|---|
| 6,317,495 B1 * | 11/2001 | Gaikwad et al. ............. | 379/417 |
| 7,460,649 B2 * | 12/2008 | Ouyang et al. ............... | 379/1.04 |
| 2006/0274825 A1 * | 12/2006 | Cioffi et al. .................... | 375/222 |
| 2006/0280236 A1 * | 12/2006 | Rhee et al. ..................... | 375/222 |
| 2009/0207985 A1 * | 8/2009 | Cioffi et al. ................ | 379/93.01 |
| 2010/0046738 A1 * | 2/2010 | Schelstraete et al. .... | 379/406.01 |
| 2010/0238987 A1 * | 9/2010 | Engstrom et al. ............. | 375/222 |

FOREIGN PATENT DOCUMENTS

| WO | WO 2005/094052 | 10/2005 |
|---|---|---|
| WO | WO 2007/146048 | 12/2007 |

OTHER PUBLICATIONS

International Search Report for PCT/EP2007/060015, mailed Jul. 21, 2008.
Written Opinion of the International Searching Authority for PCT/EP2007/060015, mailed Jul. 21, 2008.
Ginis, G et al., "Vectored-DMT: a FEXT Canceling Modulation Scheme for Coordinating Users", ICC 2001. 2001 IEEE International Conference on Communications, vol. 1 of 10, (Jun. 11, 2001), pp. 305-309.

* cited by examiner

*Primary Examiner* — Creighton Smith
(74) *Attorney, Agent, or Firm* — Nixon & Vanderhye P.C.

(57) ABSTRACT

The present invention relates to a vectoring chip unit in a DSL system connectable to a plurality of DSL ports of a DSL chip comprising means for receiving data from each of the plurality of DSL ports, means for performing pre-coding/cancellation in order to reduce crosstalk and means for transmitting a result of the precoding/cancellation to the respective DSL port. Preferably, a system is provided comprising a plurality of said vectoring chips, whereby each vectoring chip is adapted to handle pre-coding/cancellation of a predetermined frequency range and the frequency ranges of each vectoring chip are non-overlapping.

8 Claims, 7 Drawing Sheets

VECTORED DIGITAL SUBSCRIBER LINE SYSTEM HAVING MODULAR VECTORING ARRANGEMENTS

This application is the U.S. national phase of International Application No. PCT/EP2007/060015, filed 21 Sep. 2007, which designated the U.S. and claims priority to Europe Application No. 06122656.9, filed 20 Oct. 2006, and claims the benefit of U.S. Provisional Application No. 60/852,997, filed 20 Oct. 2006; the entire contents of each of which are hereby incorporated by reference.

FIELD OF THE INVENTION

The present invention relates to a digital subscriber line (DSL) system. In particular, the present invention relates to a vectored DSL system which implies that lines from a plurality of independent modems are, at the central office side, coordinated before transmission and/or after reception in order to reduce cross-talk.

BACKGROUND

Figure 1:
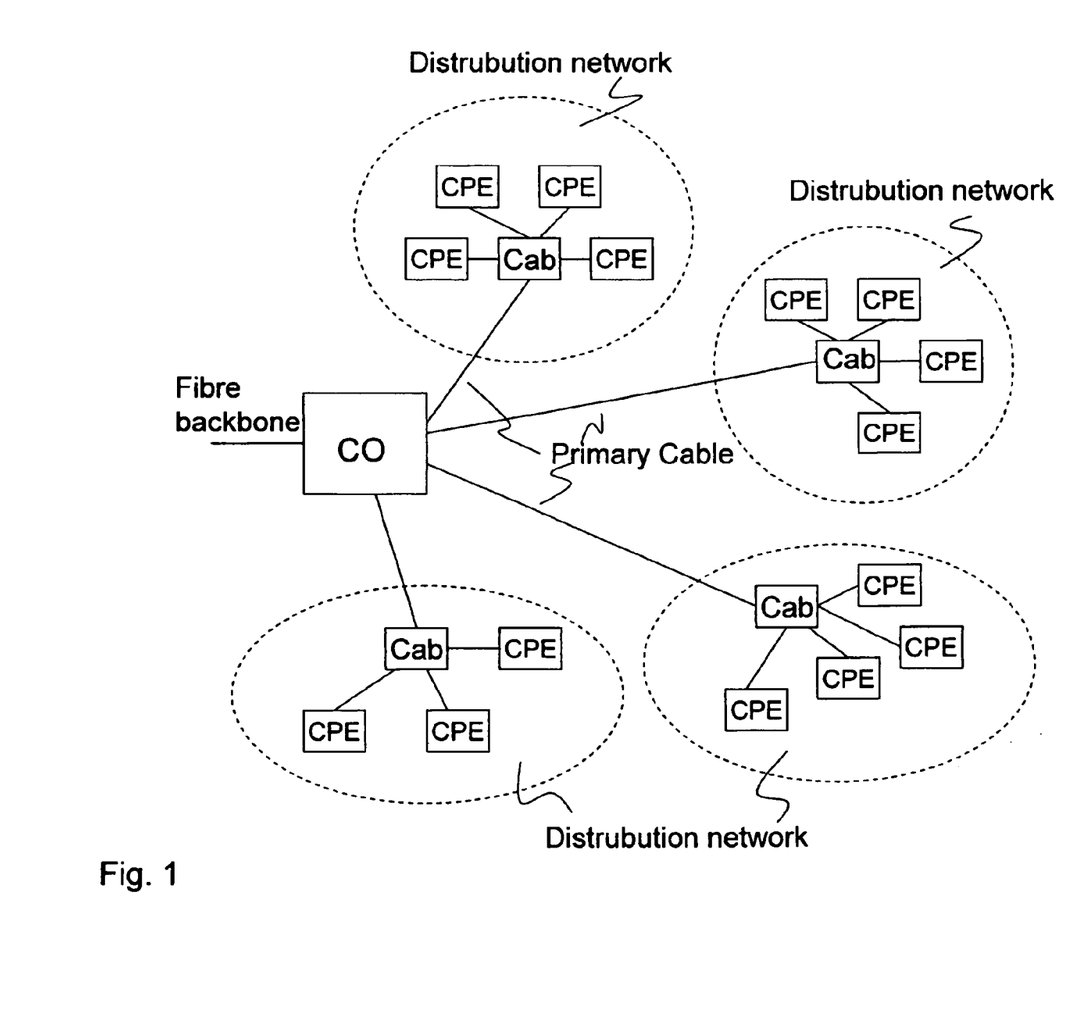
FIG. 1 illustrates a telecommunication access network wherein the present invention may be implemented.

FIG. 1 shows a telephone network constituting a star-net-topology. A fibre backbone is terminated at a Central Office (CO) supporting 500-20000 end customers. From the CO primary cables carrying 100-1200 twisted pairs runs to Cabinets (Cab) which are cross-connect-points that normally have no power and environmental capabilities. The last 100-800 meters of twisted pairs between the Cab and the customer premises is called the distribution network.

It is desirable to re-use the existing copper network for delivering high capacity data connections, i.e. broadband access, to the customer premises. The family of systems designed for this purpose is called Digital Subscriber Lines (DSL) systems. Example DSL technologies (sometimes called xDSL) include High Data Rate Digital Subscriber Line (HDSL), Asymmetric Digital Subscriber Line (ADSL), Very-high-bit-rate Digital Subscriber Line (VDSL).

The most recently standardized broadband technology for the copper networks is VDSL. It provides higher data bandwidths than precursors like ADSL and HDSL, but to the expense of shorter reach. Currently, the latest version of the VDSL-standard is called VDSL2.

For VDSL, network operators can only partly use the same deployment strategy as for ADSL, which is to install the DSL-modems in the central office. From the central office, VDSL can be offered to 30-50% of customers compared to 80-90% in the case of ADSL, dependent on the topology of the specific network. To further increase the VDSL customer base, it can be deployed from a fibre-to-the-cabinet (FTTCab) infrastructure meaning that the fibre termination point is moved closer to the premises giving a shorter copper loop. The cabinet is deployed at the local cross-connect point for the distribution network, which normally is the only point-of-presence for the cable. The VDSL digital subscriber line access multiplexer (DSLAM) equipment, where all DSL-modems are connected to the backbone network, will be placed in the new cabinet and VDSL is used to serve the customers over the last drops of cable.

Statistics of cable lengths and the network topology are crucial parameters when deploying DSL. The copper loops have the property that the possible data capacity that can be transferred decreases for longer loops. A second property that limits the possible data rates is crosstalk, i.e., self made noise that occurs between different loops in the same cable during transmission. This effect is more pronounced on shorter loops, since one important kind of crosstalk tends to decrease with increasing loop length.

Common to all existing DSL systems is that they are designed for a worst case scenario. This means that the systems are designed for a maximum cross-talk scenario, i.e., that all systems are transmitting all the time and that they generate full cross talk to each other.

Figure 2:
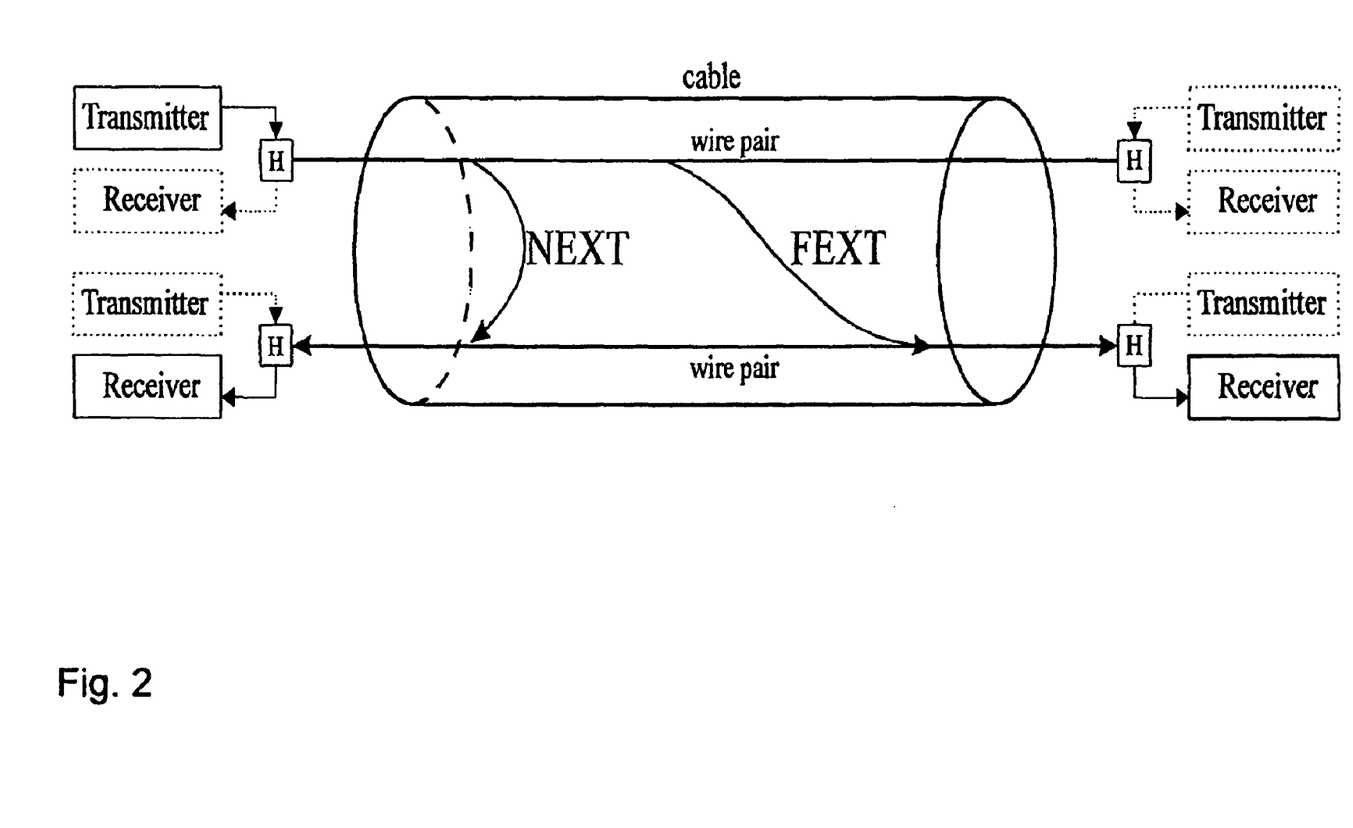
FIG. 2 illustrates schematically generated cross-talk referred to as the NEXT and the FEXT.

There are two kinds of crosstalk: Near End Cross Talk (NEXT) and Far End Cross Talk (FEXT) as illustrated in FIG. 2. The NEXT is noise that comes from a transmitter on a neighbouring pair at the same end of the line and the FEXT is noise that comes from a transmitter on a neighbouring pair located at the far end of the line.

Figure 3:
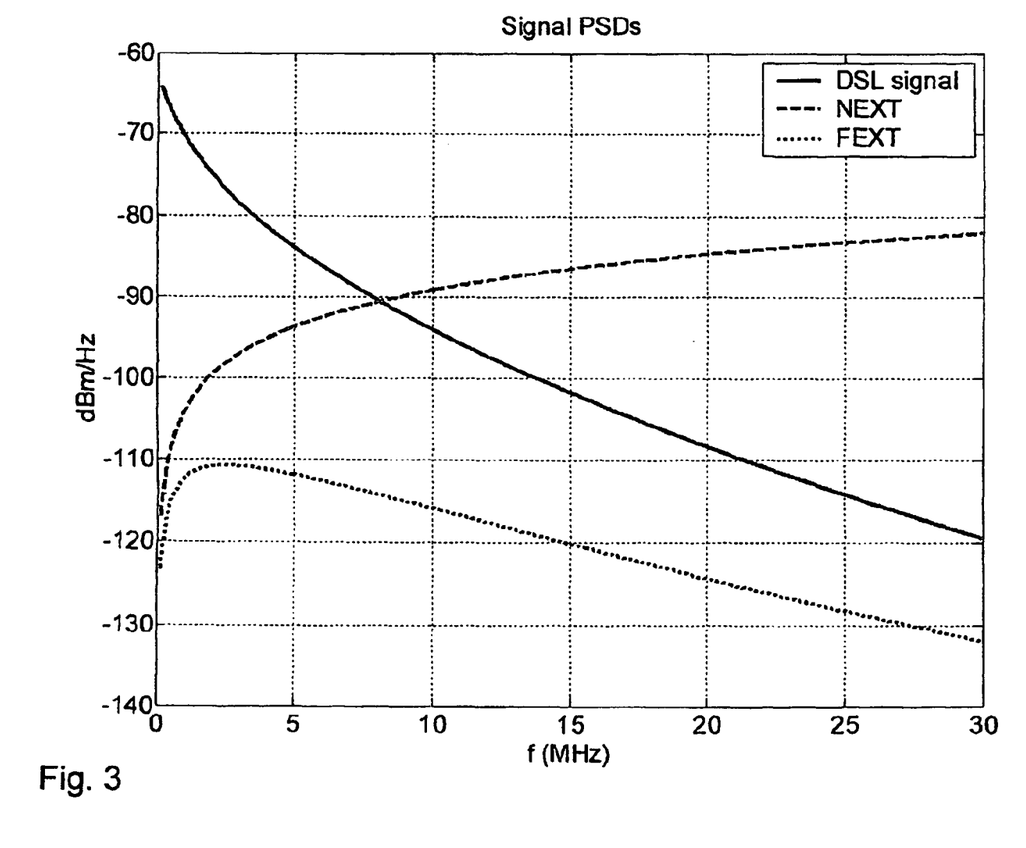
FIG. 3 is a graph illustrating an example of power spectral densities of signal attenuation, NEXT and FEXT.

The NEXT is always stronger than the FEXT and most DSL systems are designed to avoid the NEXT but assumes that there are always FEXT present. Some systems operating at low frequencies (e.g. less than 500 kHz) are designed to take into account also NEXT. This is possible since NEXT is not very severe at low frequencies, which is illustrated in FIG. 3.

By coordinating the signal transmission and reception for a plurality of modems in the CO, the FEXT can be eliminated. This is often referred to as vectored transmission, vectoring, or vectored DSL. For shorter loops the FEXT is the dominating noise source of essentially the entire frequency band. Thus, the elimination of FEXT, with vectored DSL, can substantially increase the achievable bitrates, especially for modem on shorter loops. Deployment of VDSL from the FTTCab as discussed above will lead to much shorter loops and also fewer loops in each cable. With vectored VDSL the bitrates for shorter loops (<800 m) can be increased with 50% to 200% depending on loop length. Shorter loops have normally higher levels of FEXT than longer loops, and can therefore gain more when removing the FEXT with vectoring techniques.

Coordinated signal transmission and reception of all modems, referred to as vectored DSL, is possible, since the modems are co-located in a CO or cabinet. In the upstream direction (signal reception) this is called FEXT cancellation or multi-user detection. In the downstream direction (signal transmission) it is called FEXT pre-coding, but sometimes it is also called FEXT cancellation in the downstream direction.

There exist numerous techniques for vectored transmission (i.e. the use of FEXT pre-coding and multi-user detection). However, since the FEXT vector channel has property called row-wise diagonal dominance, it has been proved that diagonalizing pre-coding for the downstream and zero forcing equalization for the upstream yields close to optimal performance which is further described in R. Cendrillon, M. Moonen, E. Van den Bogaert, G. Ginis, "The Linear Zero-Forcing Crosstalk Canceller is Near-optimal in DSL Channels", in Proc. of IEEE Global Comm. Conf. (GLOBECOMM), Dallas, Tex., pp 2334-2338, November 2004.

The drawback with all vectoring techniques is that they lead to highly complex and large chipsets and systems. The complexity of the vectoring processing grows with the square of the number of modems the vectored DSL system can handle.

To guarantee best possible bit-rate performance all modems in a cable must be part of the same vectored DSL system. If some non-vectored DSL-modems are operating on loops in the same cable as the vectored DSL-modems they will generate FEXT, which can reduce the bit rates significantly for some or all of the vectored DSL-modems.

The problem with existing solutions, is that the chip size of a VDSL chip adapted to perform vectoring sets the limits for the number of ports that could be vectorized.

SUMMARY

The object of the present invention is to increase the capacity of a vectoring arrangement in a vectored DSL system, i.e. to increase the number of DSL-modems that may be subject for the vectoring.

According to a first aspect the present relates to a vectoring chip unit in a transmitter of a DSL system connectable to at least a first and second DSL ports of a DSL chip. The vectoring chip comprises means for receiving data comprising mapped constellation points in the frequency domain from each of the DSL ports, means for pre-coding the received data from the first DSL port based on the received data from each of the DSL ports to remove the effect of cross talk from at least the second port, means for pre-coding the received data from the second DSL port based on the received data from each of the DSL ports to remove the effect of cross talk from at least the first DSL port, means for transmitting the pre-coded data associated with the first DSL port to the first DSL port, and means for transmitting the pre-coded data associated with the second DSL port to the second DSL port.

According to a second aspect the present invention relates to a vectoring chip unit in a receiver of a DSL system connectable at least to a first and second DSL ports of a DSL chip. The vectoring chip comprises means for receiving data comprising constellation points data from each of the DSL ports, means for cancelling the effect of the cross talk from at least the second port by compensating the received constellation point for the first port based on the received constellation points data from each of the DSL ports, means for cancelling the effect of the cross talk from at least the first port by compensating the received constellation point for a second port based on the received constellation points data from each of the DSL ports, means for transmitting the compensated constellation point for the first port to the first port, and means for transmitting the compensated constellation point for the second port to the second port.

According to a preferred embodiment, the vectoring chip unit according to the first and second aspect is adapted to receive data only for a pre-determined frequency set from the DSL ports.

According to another embodiment the vectoring chip according to the first and second aspect comprises one coupling to each of the DSL ports such that the vectoring chip unit is independent of the number of ports on each VDSL chip.

According to third aspect, the present invention relates to a system in a DSL system comprising at least a first vectoring chip unit according to the preferred embodiment, and a second vectoring chip unit according to the preferred embodiment whereby the pre-determined frequency set of the first vectoring chip unit is non-overlapping with the pre-determined frequency set of the second vectoring chip unit.

An advantage with the present invention is that the vectored VDSL can be implemented for a larger number of ports, with a given technology.

Moreover, by enabling the usage of VDSL chips with a minimum of vectoring logic, the VDSL chip can be competitive as a standard VDSL chip without vectoring.

A further advantage is that the modular approach according to an embodiment gives a scalable chipset with a small number of different version of the chips in the chipset.

DETAILED DESCRIPTION

In the following description, for purposes of explanation and not limitation, specific details are set forth, such as particular sequences of steps, signalling protocols and device configurations in order to provide a thorough understanding of the present invention. It will be apparent to one skilled in the art that the present invention may be practised in other embodiments that depart from these specific details.

Moreover, those skilled in the art will appreciate that the functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

The present invention relates to DSL systems. The invention is described by using VDSL, but it should be noted that other DSL techniques such as ADSL also may be used in conjunction with the present invention.

Figure 5:
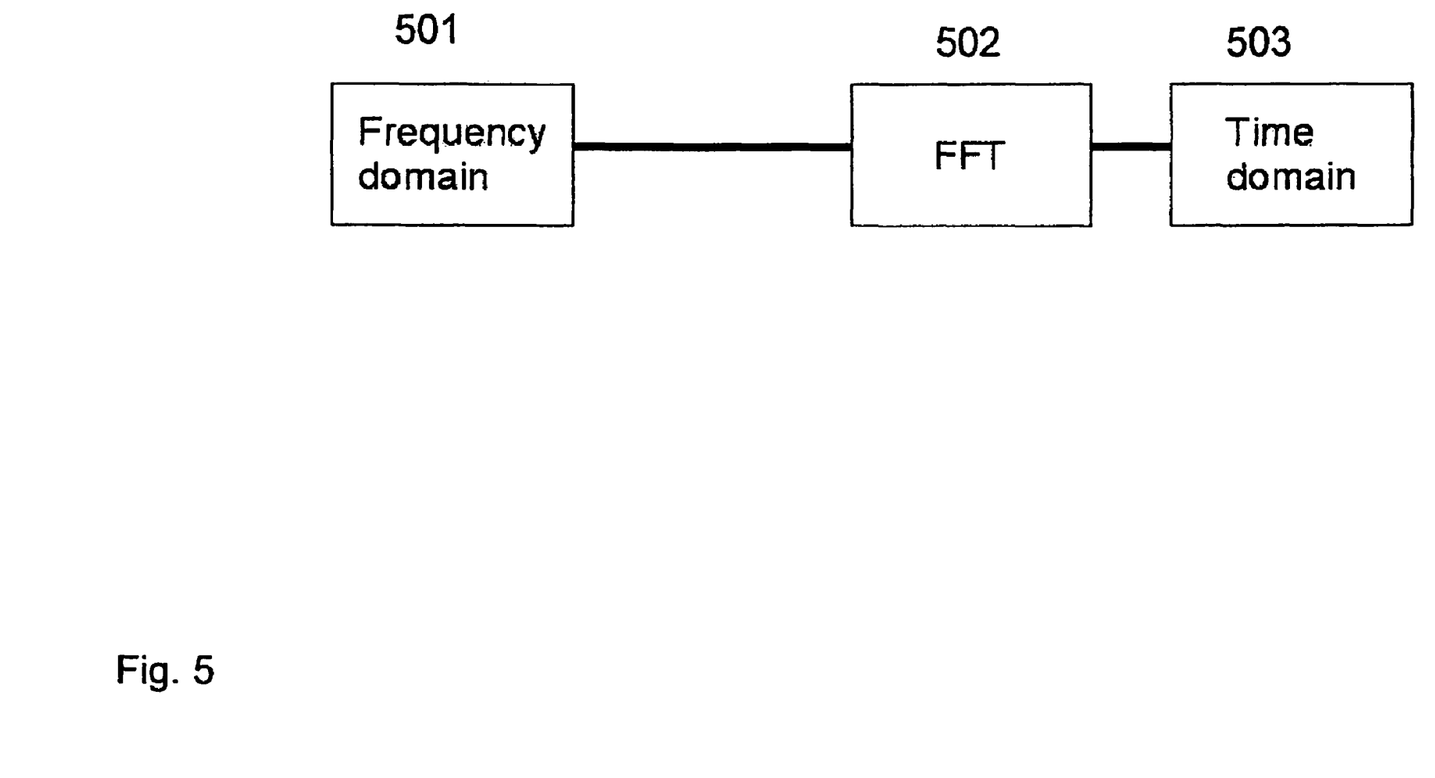
FIG. 5 illustrates a VDSL port.
Figure 6:
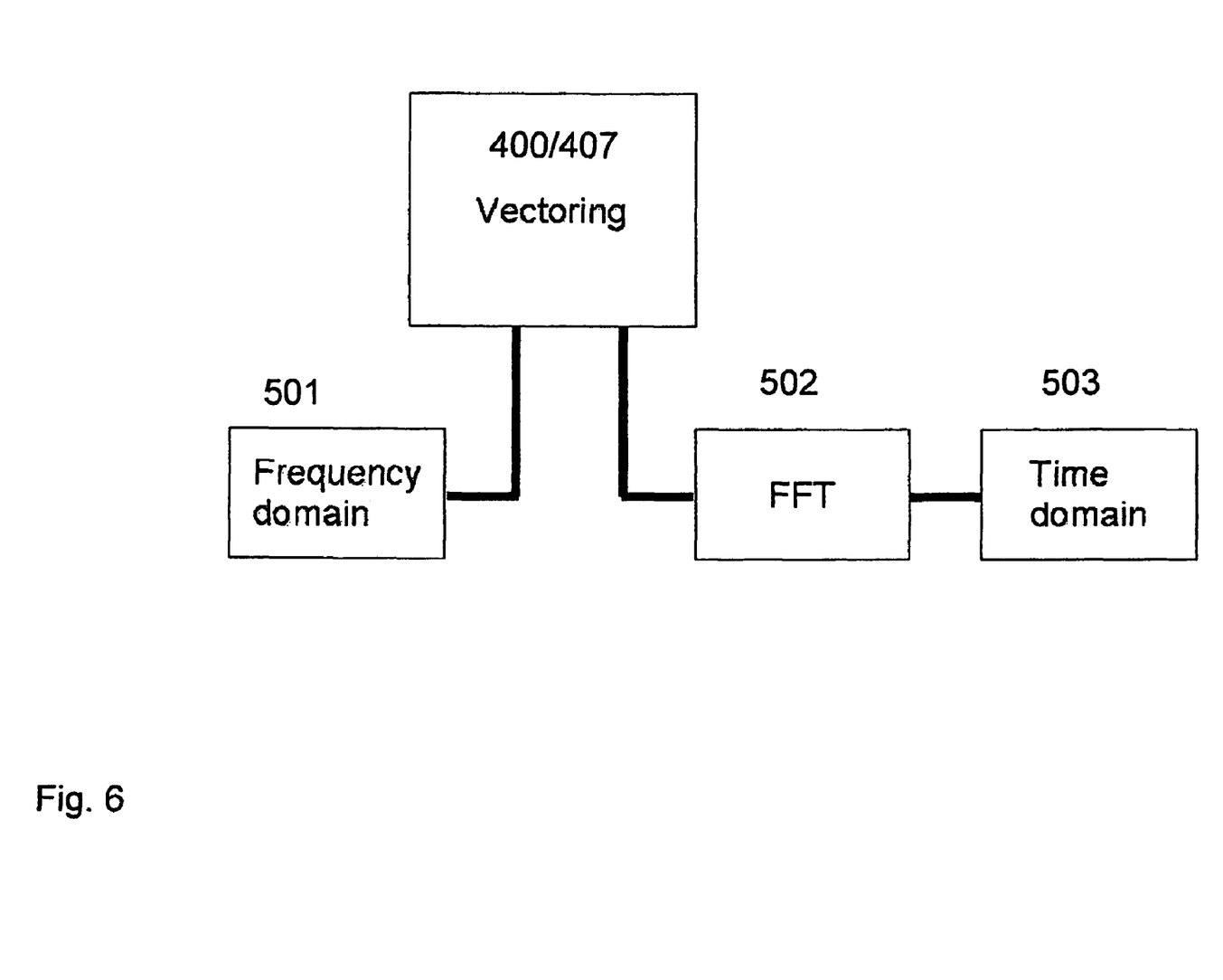
FIG. 6 illustrates a VDSL port in accordance with FIG. 5 and a connected vectoring chip unit according to the invention.

Standard VDSL implementations are hardware intensive, a large part of the VDSL chip area is memory imposed by the standard. In the prior art, the VDSL chip also comprises means for performing the calculations associated with the vectoring. The basic idea of the present invention is to separate the vectoring logic from the DSL chip to a vectoring chip. By providing the vectoring chip according to the present invention, the DSL chip may comprise an increased number of ports since capacity is released that previously was used for handling the vectoring now can be used for providing an increased number of DSL ports. This vectoring chip may be connected to the ports of the DSL-chips with high speed links in a star topology. In this specification, the term port is used and a DSL-chip comprises a plurality of ports, e.g. 12 ports. A VDSL port is illustrated in FIG. 5. The port 500 comprises a frequency domain part 501 connected to a Fast Fourier Transform unit 502 that is further connected to a time domain part 503. According to the present invention a vectoring chip unit 400, 407 is connectable between the frequency domain part 501 and the FFT unit 502 as illustrated in FIG. 6.

The vectoring, i.e. the downstream pre-coding and/or upstream cancellation, is performed on the frequency domain data. The downstream data is modified before a fast fourier transformation and the upstream data is modified directly after the fast fourier transformation.

The data received from the DSL ports is the data that is to be transmitted, d1, d2 ... d8 transmitted on port 1 to 8. The precoder of the vectoring chip pre-codes the data to dv 1, dv2 ... dv8. The precoder determines coefficients c11, c12 ... c18 describing how the data should be modified before transmission. Thus the pre-coded data transmitted to the first port is dv1=d1*c11+d2*c12+ ... +d8*c18 and the pre-coded data transmitted to the eight port is dv8=d1*c81+d2*c82+ ... +d8*c88.

Figure 4A:
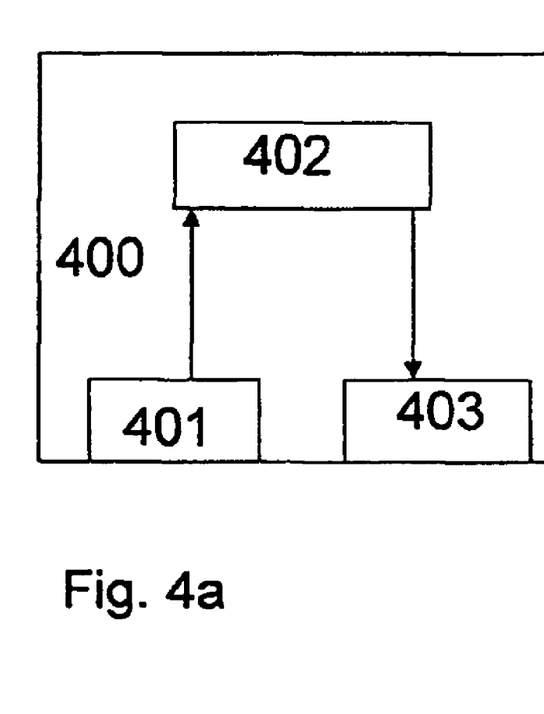
FIGS. 4a and 4b illustrates a vectoring chip unit according to the present invention

The vectoring unit located in the transmitter is illustrated in FIG. 4a and in the example below the vectoring unit is connectable to two ports. It is however obvious for a person skilled in the art that the vectoring unit may be connectable to an arbitrary number of ports. The vectoring chip unit 400 located in a transmitter comprises means 401 for receiving data, i.e. d1, d2 comprising mapped constellation points in the frequency domain from each of the DSL ports 1, 2 means 402 for pre-coding (i.e. determining c11, c12 and dv1) the received data from a first DSL port 1 of the plurality of the DSL ports based on the received data from each of the plurality of DSL ports to remove the effect of cross talk from other ports of the plurality of DSL ports, means 402 for pre-coding (i.e. determining c21, c22 and dv2) the received data from a second DSL port 2 of the plurality of the DSL ports based on the received data from each of the plurality of DSL ports to remove the effect of cross talk from other ports, i.e. the first port 1 in this example, means 403 for transmitting the pre-coded data dv1 associated with the first DSL port to the first DSL port, and means 403 for transmitting the pre-coded data dv 2 associated with the second DSL port to the second DSL port.

Figure 4B:
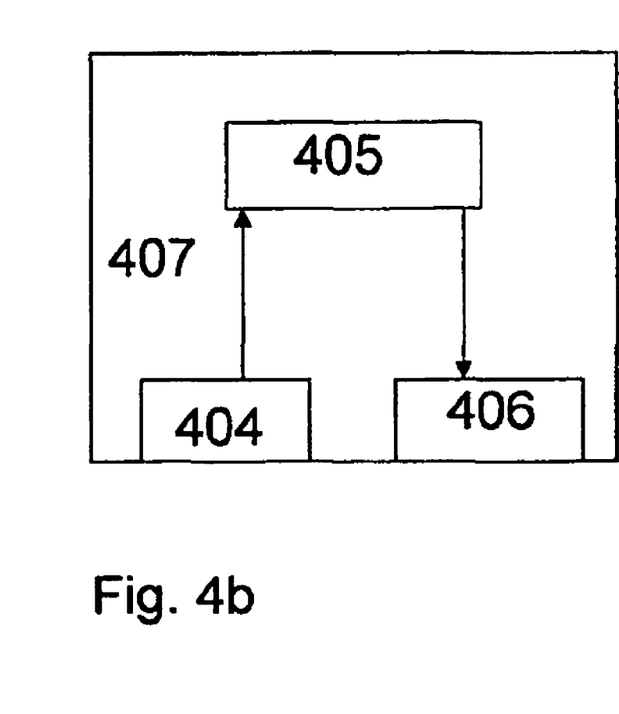

The vectoring unit located in the receiver is illustrated in FIG. 4b and in the example below the vectoring unit 407 is connectable to two ports. It is however obvious for a person skilled in the art that the vectoring unit may be connectable to an arbitrary number of ports. The vectoring chip unit 407 located in a transmitter comprises means 404 for receiving data comprising constellation points data from each of the DSL ports, means 405 for cancelling the effect of the cross talk from at least the second port by compensating the received constellation point for the first port based on the received constellation points data from each of the DSL ports, means 405 for cancelling the effect of the cross talk from at least the first port by compensating the received constellation point for a second port based on the received constellation points data from each of the DSL ports, means 406 for transmitting the compensated constellation point for the first port to the first port, and means 406 for transmitting the compensated constellation point for the second port to the second port.

By factoring out the vectoring part to a separate chip 400, 407 referred to as the vectoring chip, the number of ports that can be subject for vectoring increases. However, still the size of the vectoring chip sets a limit on the number of ports.

According to a preferred embodiment, it is possible to take advantage of the fact that there is no correlation between the cancellation/pre-coding calculations in disjoint parts of the frequency spectrum. I.e. no information associated with a second tone is required when determining the vectoring for a first tone. Thus the logic for determining the vectoring (pre-coding/cancellation) for a first frequency band (e.g. for a first number of tones) is implemented on a first vectoring chip and the logic for determining the vectoring for a second frequency band is implemented on a second vectoring chip, whereby the first and second frequency bands are non-overlapping. It should be noted that the frequency bands are not required to be continuous bands, the requirement is that no frequency is handled by more than one vectoring chip.

The following definitions are used in order to describe the invention. The complete spectrum implies all tones of the DSL system, i.e. 4096 tones in a VDSL system. A subset of the spectrum implies the tones for which the system performs vectoring. A slice of the spectrum implies the tones handled by a single vectoring chip, according to the present invention, in the system. The term vectoring means in this specification pre-coding in the downlink direction (from the CO to the user) and cancellation (also referred to as multi-user detection) in the upstream direction (from the user to the CO).

The preferred embodiment of the present invention is based on the fact that there is no correlation between the cancellation/pre-coding calculations in disjoint parts of the frequency spectrum as stated above. That makes it possible to divide the vectoring logic onto at least a first and second vectoring chip, whereby the vectoring chips are adapted to work in parallel on disjoint parts of the frequency spectrum. Each vectoring chip receives data from all VDSL ports. It should be noted that a tone is a pre-defined frequency range. Both the terms tone and frequency are used in this specification.

According to the present invention a vectoring chip is provided as a general computation unit for computing for each tone the linear combination of the input from all ports with respect to the cross talk coefficients.

The vectoring chip may be deployed:
as a single vectoring chip handling all ports and a subset of the spectrum according to the invention.
in a system comprising a multiple vectoring chips as a multi chip solution where each vectoring chip handles all ports and each vectoring chip handles a slice of the subset of the spectrum.

Figure 7:
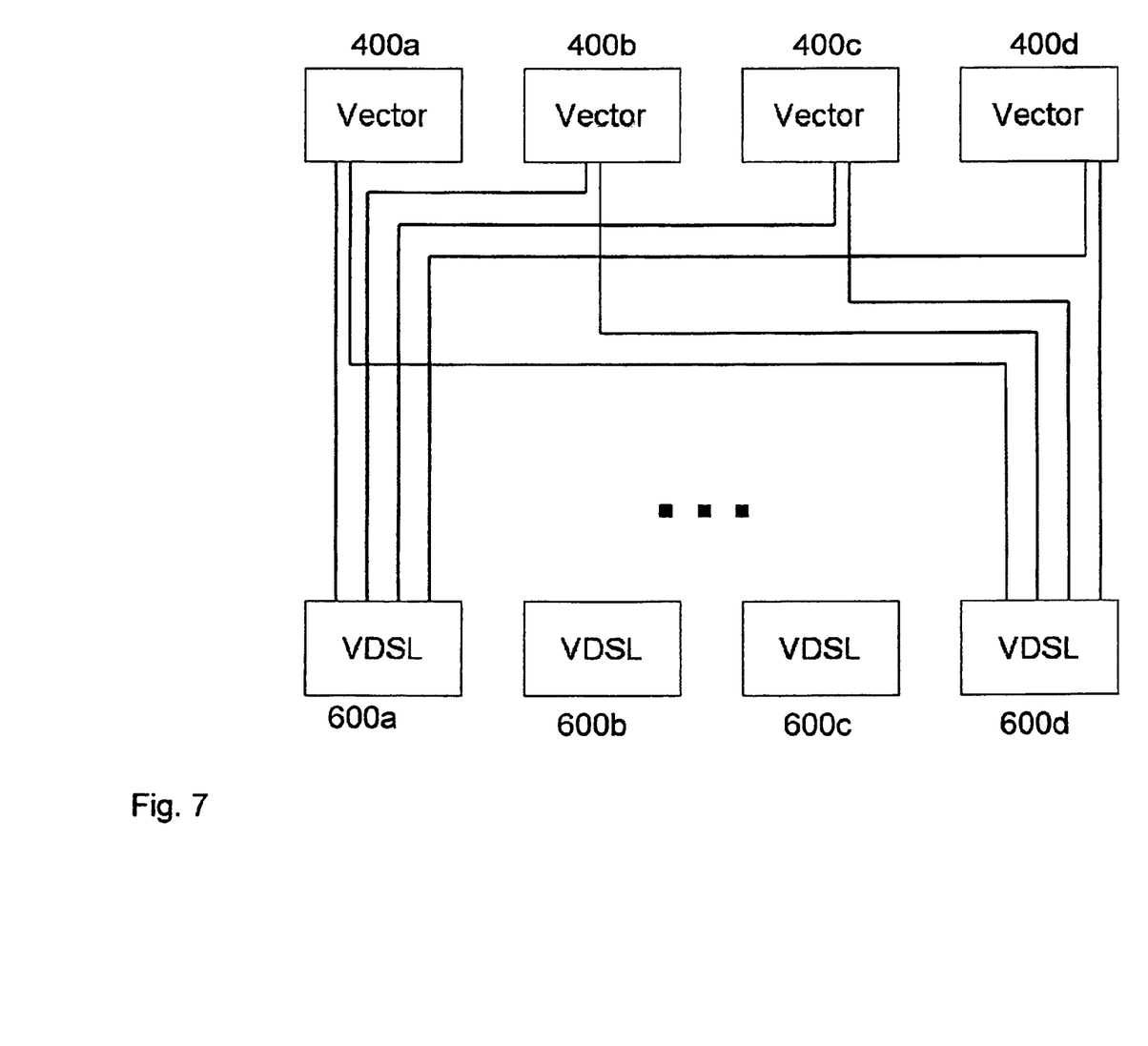
FIG. 7 illustrates a multiple vectoring chip units according to an embodiment of the present invention.

In the multi chip solution illustrated by FIG. 7, each chip 400a-400d is responsible for the pre-coding and cancellation calculations of a pre-defined part of the spectrum, i.e. for pre-defined tones. Thus, according to an embodiment of the present invention a system may be provided comprising a plurality of vectoring chips 400a-400d and a plurality of VDSL ports 600a-600d. Each vectoring chip is adapted to perform vectoring (i.e. pre-coding in the downstream direction and cancellation in the upstream direction) only for a pre-determined frequency range, wherein the frequency ranges of each of the vectoring chips are non-overlapping. E.g. the vectoring chip 400a may be adapted to apply vectoring on downstream band 2, the vectoring chip 400b may be adapted to apply vectoring on downstream band 3, the vectoring chip 400c may be adapted to apply vectoring on downstream band 4, the vectoring chip 400d may be adapted to apply vectoring on downstream band 5. Each VDSL port is connected to each vectoring chip. Each of the connections between the VDSL ports 600a-600d and the vectoring chips 400a-400d are a two-way connection as indicated in FIG. 6.

In system located in a transmitter each of the vectoring chips receive data comprising mapped constellation points in the frequency domain from each of the plurality of VDSL ports. Each of the vectoring chips comprises a precoder, also referred to as means for pre-coding. The pre-coder pre-codes the received data from a first DSL port of the plurality of the DSL ports based on the received data from each of the plurality of DSL ports to remove the effect of cross talk from other ports of the plurality of DSL ports, transmits the pre-coded data associated with the first DSL port to the first DSL port, and pre-codes the received data from a second DSL port of the plurality of the DSL ports based on the received data from each of the plurality of DSL ports to remove the effect of cross talk from other ports of the plurality of DSL ports, and transmits the pre-coded data associated with the second DSL port to the second DSL port. This process continues until all data for all DSL ports are pre-coded.

In system located in a receiver each of the vectoring chips receives data comprising constellation points data from each of the DSL ports, cancels the effect of the cross talk from the other ports by compensating the received constellation point for the first port based on the received constellation points data from each of the DSL ports, transmits the compensated constellation point for the first port to the first port, cancels the effect of the cross talk from the other ports by compensating the received constellation point for a second port based on the received constellation points data from each of the DSL ports, and transmits the compensated constellation point for the second port to the second port. This process continues until all data for all DSL ports are compensated such that the cross-talk may be cancelled.

The interface between the VDSL chip and the vectoring chip is configured such that there is a coupling per port between the vectoring chip and the DSL modem. Hence, there is no coupling between the number of VDSL ports per chip and the vectoring chip. Seen from the vectoring chip it is transparent if it handles 16 VDSL ports from one VDSL chip or 16 VDSL ports implemented as 4 VDSL chips with 4 ports each.

The present invention is suitable for a modular-based implementation. This is exemplified by the following scenario.

A network operator has VDSL chips, where each VDSL chip comprises 12 ports, and vectoring chips, where each vectoring chip has a capacity of handling 12 ports. By using the above described VDSL chips and the vectoring chips a scalable chipset with a small number of different version of the chips in the chipset is provided. Hence, if the operator wants to apply vectoring on 12 ports, one VDSL chip and one vectoring chip is required. If the operator instead wants to apply vectoring on 24 ports, two VDSL chips and four vectoring chips are required, since a duplication of the ports results in that the required capacity of the vectoring chips is squared. Each of the vectoring chips handles a fourth of the subset of the spectrum, i.e. a fourth of the tones available for vectoring, where the frequencies of each fourth of the spectrum handled by one of the vectoring chips do not overlap with frequencies of another fourth.

While the present invention has been described with respect to particular embodiments (including certain device arrangements and certain orders of steps within various methods), those skilled in the art will recognize that the present invention is not limited to the specific embodiments described and illustrated herein. Therefore, it is to be understood that this disclosure is only illustrative. Accordingly, it is intended that the invention be limited only by the scope of the claims appended hereto.

The invention claimed is:

1. A vectoring chip unit in a transmitter of a DSL system connectable to at least a first and second DSL ports of a DSL chip characterised by:

means for receiving data comprising mapped constellation points in the frequency domain from each of the DSL ports, means for pre-coding the received data from the first DSL port based on the received data from each of the DSL ports to remove the effect of cross talk from at least the second port, means for pre-coding the received data from the second DSL port based on the received data from each of the DSL ports to remove the effect of cross talk from at least the first DSL port, means for transmitting the pre-coded data associated with the first DSL port to the first DSL port, and means for transmitting the pre-coded data associated with the second DSL port to the second DSL port.

2. The vectoring chip unit according to claim 1, characterised in that the vectoring chip unit is adapted to receive data only for a pre-determined frequency set from the DSL ports.

3. The vectoring chip unit according to claim 1, characterised in that it comprises one coupling to each of the DSL ports such that the vectoring chip unit is independent of the number of ports on each DSL chip.

4. A vectoring chip unit in a receiver of a DSL system connectable at least to a first and second DSL ports of a DSL chip characterised by:

means for receiving data comprising constellation points data from each of the DSL ports, means for cancelling the effect of the cross talk from at least the second port by compensating the received constellation point for the first port based on the received constellation points data from each of the DSL ports, means for cancelling the effect of the cross talk from at least the first port by compensating the received constellation point for a second port based on the received constellation points data from each of the DSL ports, means for transmitting the compensated constellation point for the first port to the first port, and means for transmitting the compensated constellation point for the second port to the second port.

5. The vectoring chip unit according to claim 4, characterised in that the vectoring chip unit is adapted to receive data only for a pre-determined frequency set from the DSL ports.

6. The vectoring chip unit according to claim 1, characterised in that it comprises one coupling to each of the DSL ports such that the vectoring chip unit is independent of the number of ports on each VDSL chip.

7. A system in a DSL system comprising at least a first vectoring chip unit according to claim 2, and a second vectoring chip unit according to claim 2 whereby the pre-determined frequency set of the first vectoring chip unit is non-overlapping with the pre-determined frequency set of the second vectoring chip unit.

8. A system in a DSL system comprising at least a first vectoring chip unit according to claim 5, and a second vectoring chip unit according to claim 5 whereby the pre-determined frequency set of the first vectoring chip unit is non-overlapping with the pre-determined frequency set of the second vectoring chip unit.

* * * * *